US009522704B1

(12) United States Patent
Krajenke et al.

(10) Patent No.: US 9,522,704 B1
(45) Date of Patent: Dec. 20, 2016

(54) POWERED CLOSING TAILGATE ASSEMBLY

(71) Applicant: GM GLOBAL TECHNOLOGY OPERATIONS LLC, Detroit, MI (US)

(72) Inventors: Gary W. Krajenke, Warren, MI (US); Mark G. Rogers, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/811,078

(22) Filed: Jul. 28, 2015

(51) Int. Cl.
*B62D 33/03* (2006.01)
*E05F 15/611* (2015.01)
*E05F 15/627* (2015.01)
*B62D 33/027* (2006.01)
*E05F 1/00* (2006.01)

(52) U.S. Cl.
CPC .......... *B62D 33/0273* (2013.01); *B62D 33/03* (2013.01); *E05F 1/002* (2013.01); *E05F 15/611* (2015.01); *E05F 15/627* (2015.01)

(58) Field of Classification Search
CPC .......... B60J 5/102; B60J 5/108; B60P 1/273; B62D 33/027; B62D 33/0273; B62D 33/03; E05F 1/002; E05F 15/603; E05F 15/608; E05F 15/611; E05F 15/627
USPC .................................................. 296/50, 57.1
See application file for complete search history.

(56) References Cited

U.S. PATENT DOCUMENTS

| 6,068,321 | A  | * | 5/2000 | Ooms ............... | B62D 33/0273 296/146.4 |
| 6,793,264 | B1 | * | 9/2004 | Muller .................. | E05F 1/1091 16/71 |
| 7,357,435 | B2 | * | 4/2008 | Robertson ........... | B60R 25/1001 296/146.4 |
| 7,677,628 | B2 | * | 3/2010 | Lowentat ............. | E05F 15/627 296/146.8 |
| 8,109,553 | B2 | * | 2/2012 | Zielinsky ............. | B60P 1/267 296/106 |
| 9,114,692 | B2 | * | 8/2015 | Kerr, III ................ | B60J 5/108 |

FOREIGN PATENT DOCUMENTS

FR          2796097 A1 *  1/2001  ........... E05F 1/1091

* cited by examiner

*Primary Examiner* — Jason S Daniels
(74) *Attorney, Agent, or Firm* — Quinn Law Group, PLLC (57) ABSTRACT

A tailgate assembly includes a drum that is rotatable about a drive axis, and an actuator for rotating the drum. A first cable is attached to the drum, and is spooled about the drum in response to rotation of the drum. The first cable extends through an opening in the tailgate structure, and is attached to a sidewall of a cargo box. A first guide assembly includes a first roller guide defining a first roller groove. The first cable is engaged with and guided by the first roller groove. The first guide assembly redirects a path of the first cable, and is rotatable relative to the tailgate assembly about a first guide axis. The first roller guide rotates about the first guide axis to maintain the first cable within the first roller groove as the tailgate assembly rotates about the tailgate axis between an open position and a closed position.

15 Claims, 6 Drawing Sheets

POWERED CLOSING TAILGATE ASSEMBLY

TECHNICAL FIELD

The disclosure generally relates to a tailgate assembly for a cargo box of a vehicle.

BACKGROUND

Some vehicles, such as pick-up trucks for example, include a cargo box, sometimes referred to as a truck bed. The cargo box includes a bottom wall, a first side wall, a second side wall, and a forward end wall. A tailgate assembly is rotatably attached to the cargo box, and is rotatable between an open position, and a closed position. When positioned in the closed position, the tailgate assembly defines a rearward end wall of the cargo box. When positioned in the open position, the tailgate assembly provides access to the storage area of the cargo box.

A latch mechanism secures the tailgate assembly to the cargo box when in the closed position. In order to move the tailgate assembly from the closed position into the open position, the latch mechanism must be released, thereby allowing the tailgate assembly to lower or rotate downward into the open position. In order to move the tailgate assembly from the open position into the closed position, the tailgate assembly must be rotated upward, whereby the latch mechanism automatically latches and secures the tailgate assembly in the closed position relative to the cargo box.

SUMMARY

A cargo box is provided. The cargo box includes a box structure having a first side wall, and a tailgate assembly rotatably attached to the box structure. The tailgate assembly is moveable relative to the box structure between an open position and a closed position. The tailgate assembly rotates about a tailgate axis. The tailgate assembly includes a drum rotatable about a drive axis. A first cable is attached to both the drum and the first side wall. An actuator is coupled to the drum, and is operable to rotate the drum about the drive axis. The actuator rotates the drum about the drive axis in a first rotational direction to wind the first cable around the drum, and thereby to rotate the tailgate assembly about the tailgate axis, from the open position into the closed position.

A tailgate assembly is also provided. The tailgate assembly includes a tailgate structure that is disposed generally parallel with a reference plane. The tailgate structure extends along a tailgate axis, disposed on the reference plane. The tailgate structure defines an interior space, and is configured for rotation about the tailgate axis between an open position and a closed position. A drum is supported by the tailgate structure within the interior space of the tailgate structure. The drum is rotatable relative to the tailgate structure about a drive axis. An actuator is supported by the tailgate structure, and is coupled to the drum. The actuator is operable to rotate the drum about the drive axis in a first rotational direction. A first cable is attached to the drum, and spooled about the drum in response to rotation of the drum in the first rotational direction. The first cable extends through an opening in the tailgate structure to a rotatable cable connection configured for connecting the first cable to a structural component of a vehicle. A first guide assembly is disposed within the interior space of the tailgate structure. The first guide assembly includes a first roller guide defining a first roller groove. The first cable is engaged with and guided by the first roller groove. The first guide assembly redirects the first cable between an orientation generally parallel with the reference plane, and an orientation generally transverse to the reference plane. The first roller guide is rotatable relative to the tailgate assembly about a first guide axis. The first guide axis is generally perpendicular to the tailgate axis. The first roller guide rotates about the first guide axis to maintain the first cable within the first roller groove of the first guide assembly as the tailgate assembly rotates about the tailgate axis between the open position and the closed position.

Accordingly, when the tailgate assembly is positioned in the open position, i.e., lowered, the actuator may be used to rotate the drum, which winds the first cable about the drum. Winding the first cable about the drum shortens the length of the first cable between the drum and the structural component of the vehicle to which it is attached, such as the first side wall of the cargo box. As the actuator winds the first cable about the drum, the tailgate assembly is lifted or rotated upward about the tailgate axis, into the closed position. Accordingly, the tailgate assembly may be closed automatically, without a user manually lifting the tailgate assembly.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
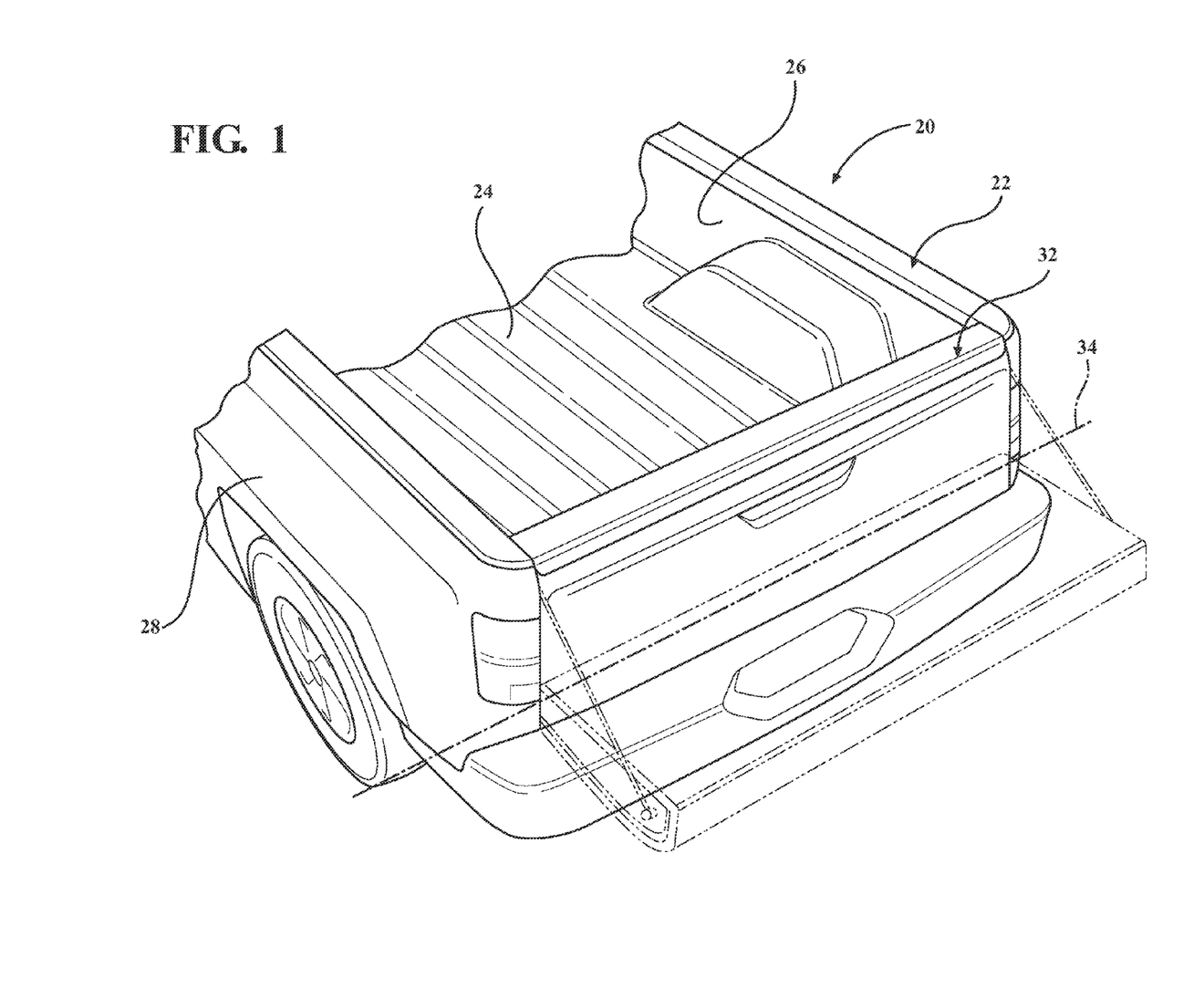
FIG. 1 is a schematic perspective view of a cargo box showing a tailgate assembly.

Referring to the Figures, wherein like numerals indicate like parts throughout the several views, a cargo box for a vehicle is generally shown at 20. Referring to FIG. 1, the cargo box 20 may include, but is not limited to, a truck bed for a pick-up truck, or some other similar structure. However, it should be appreciated that the cargo box 20 may be configured differently than the exemplary embodiment of a pick-up truck bed shown in the Figures.

The cargo box 20 includes a box structure 22. As shown in the exemplary embodiment shown in the Figures, the box structure 22 includes a bottom wall 24, a first side wall 26, a second side wall 28. The box structure 22 may further include a forward end wall (not shown). The first side wall 26 and the second side wall 28 are disposed on opposite sides of the bottom wall 24, across from each other, and are laterally spaced from each other. The forward end wall extends between the first side wall 26 and the second side wall 28, and is disposed at a forward longitudinal end of the bottom wall 24. A tailgate assembly 32 is attached to the box structure 22, and extends between the first side wall 26 and the second side wall 28, at a rearward longitudinal end of the bottom wall 24. The tailgate assembly 32 is disposed opposite the forward end wall.

Figure 2:
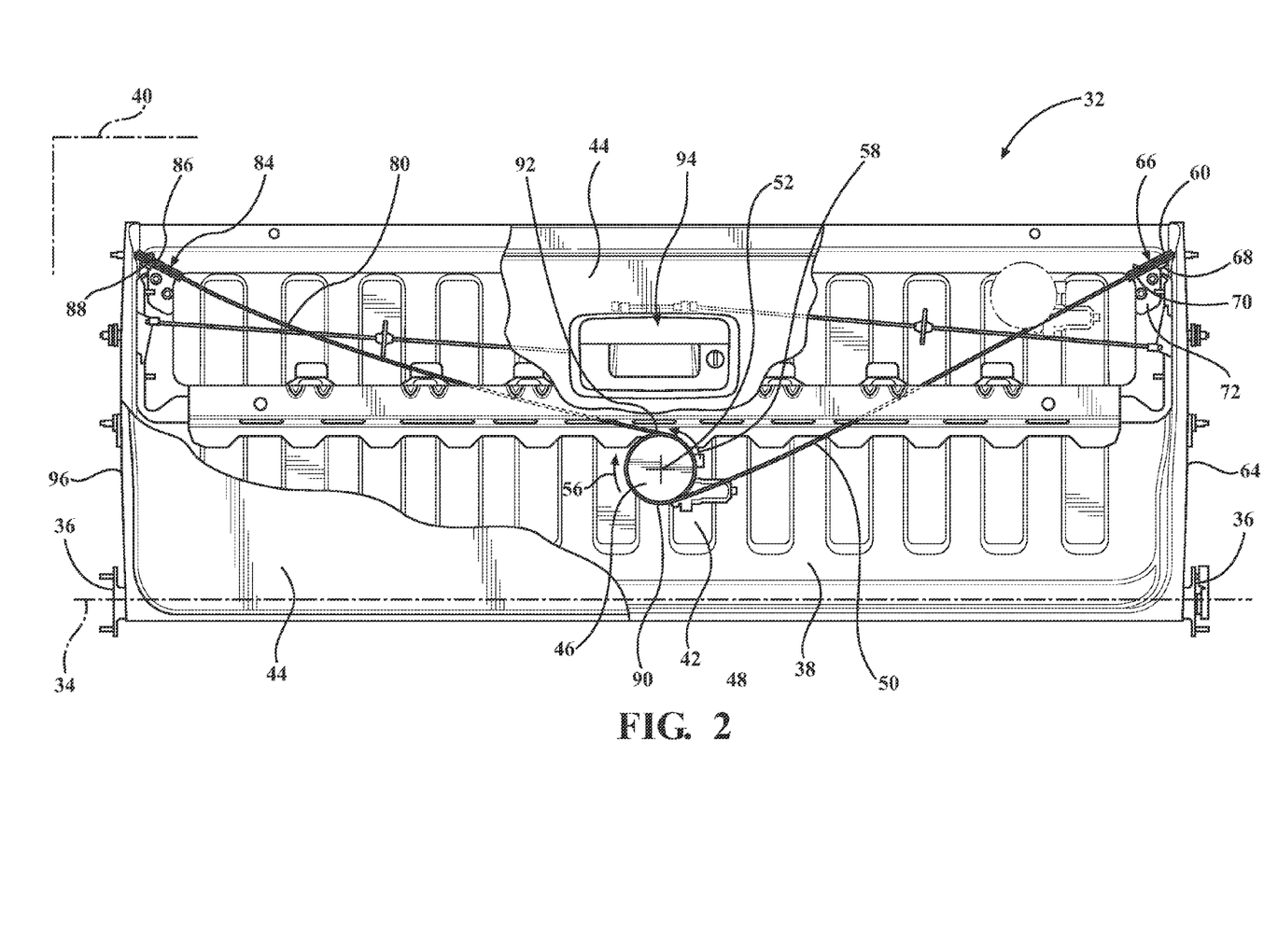
FIG. 2 is a schematic, cut-away plan view of an interior space of the tailgate assembly showing a lifting mechanism of the tailgate assembly.

As shown in FIG. 1, the tailgate assembly 32 is rotatably attached to the box structure 22. The tailgate assembly 32 is rotatable relative to the box structure 22 about a tailgate axis 34. Referring also to FIG. 2, a hinge connection 36 may attach the tailgate assembly 32 to the box structure 22, and define the tailgate axis 34 about which the tailgate assembly 32 rotates. The tailgate assembly 32 is rotatable between an open position, and a closed position. FIG. 1 shows the tailgate assembly 32 in the closed position with solid lines, and shows the tailgate assembly 32 in the open position in phantom lines. When the tailgate assembly 32 is disposed in the closed position, the tailgate assembly 32 extends substantially vertically, generally perpendicular to the bottom wall 24, and generally parallel with the first side wall 26, the second side wall 28, and the forward end wall. When the tailgate assembly 32 is disposed on the open position, the tailgate assembly 32 extends substantially horizontally, generally parallel with the bottom wall 24, and generally perpendicular to the first side wall 26, the second side wall 28, and the forward end wall.

Referring to FIG. 2, the tailgate assembly 32 includes a tailgate structure 38 that is generally planar, and that is disposed generally parallel with a reference plane 40. The tailgate structure 38 extends along the tailgate axis 34, between the first side wall 26 and the second side wall 28 of the box structure 22. The tailgate structure 38 includes a rigid framework that supports the various components of the tailgate assembly 32. The tailgate structure 38 defines an interior space 42, which may be covered by an outer panel 44 or other similar covering. The various components of the tailgate assembly 32 may be disposed within the interior space 42 of the tailgate structure 38, and covered by the outer panel 44 to protect them from dirt and debris, as well as provide an aesthetically pleasing body structure.

Figure 3:
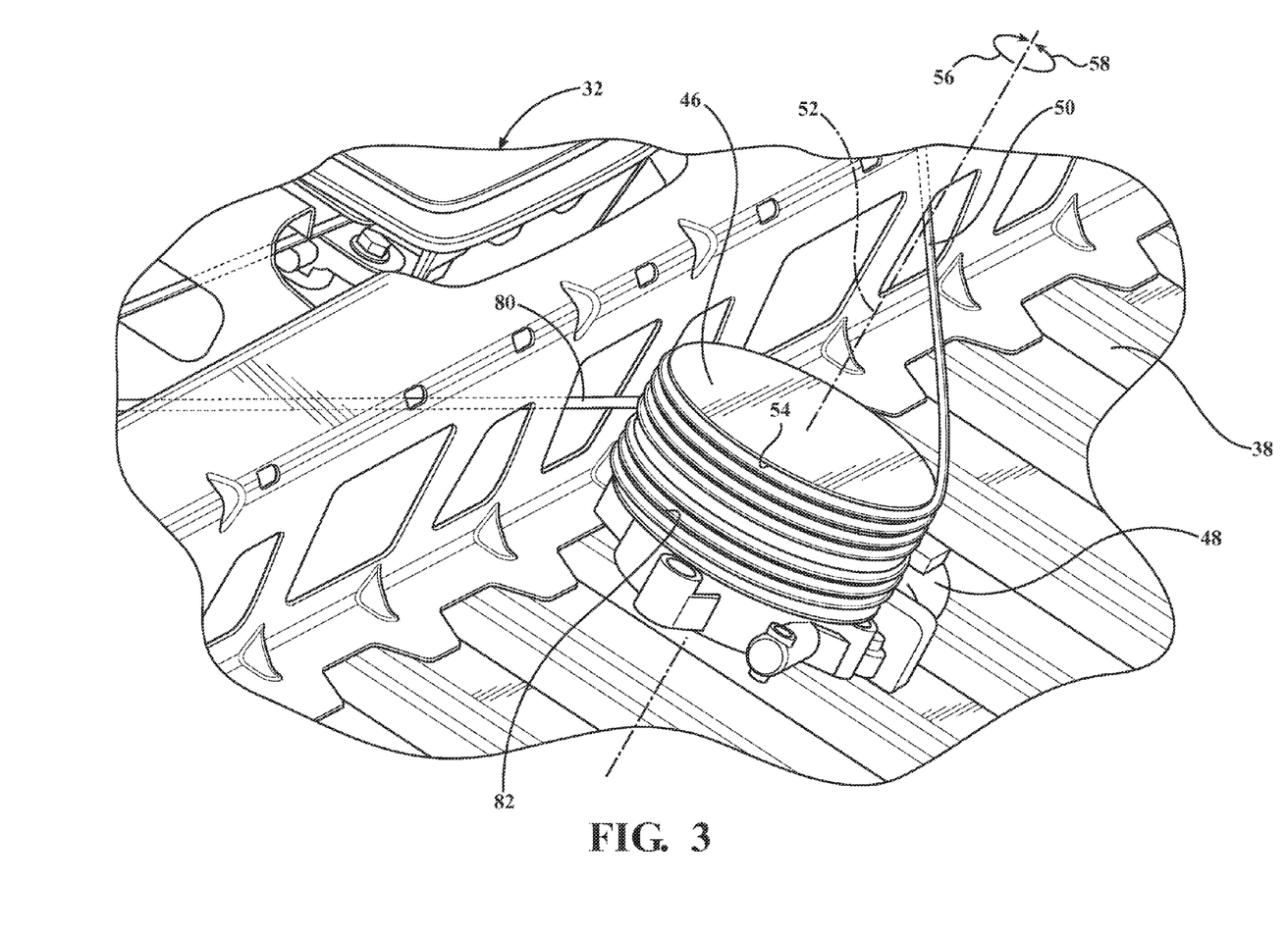
FIG. 3 is a partial, schematic perspective view of the tailgate assembly showing a drum of the lifting mechanism.

The tailgate assembly 32 includes a lifting mechanism, which is operable to lift or rotate the tailgate assembly 32 from the open or lowered position into the closed or raised position. Referring to FIG. 2, the lifting mechanism includes a drum 46, an actuator 48, and at least a first cable 50. The drum 46 is supported by the tailgate structure 38 within the interior space 42 of the tailgate structure 38. The drum 46 is rotatable relative to the tailgate structure 38 about a drive axis 52. As shown in FIG. 3, the drum 46 includes a surface that defines a first helical groove 54. The first helical groove 54 includes a groove formed into the shape of a helix around an outer circumference of the drum 46. As used herein, the term "helix" or "helical" is defined as an object having a three dimension shape like that of a wire wound uniformly in a single layer around a cylinder. The first cable 50 is engaged with and/or disposed within the first helical groove 54, and guided by the first helical groove 54 as the drum 46 rotates about the drive axis 52 so that the first cable 50 does not overlap itself while being spooled up on the drum 46.

Referring to FIG. 2, the actuator 48 is attached to and supported by the tailgate structure 38, within the interior space 42 of the tailgate structure 38. The actuator 48 is coupled to the drum 46. The drum 46 may be directly mounted to the actuator 48 and indirectly supported by the tailgate structure 38 via the actuator 48. Alternatively, the drum 46 may be rotatably attached to and supported by the tailgate structure 38, and coupled to the actuator 48 to receive a motive force or input from the actuator 48. The actuator 48 may include any device capable of providing a motive output that may be used to rotate the drum 46, such as but not limited to an electric motor or other similar device.

The drum 46 may rotate about the drive axis 52 in either a first rotational direction 56, or an opposite second rotational direction 58. The actuator 48 is operable to rotate the drum 46 about the drive axis 52 in the first rotational direction 56. The drum 46 rotates in the first rotational direction 56 to wind or spool the first cable 50 around or onto the drum 46 to rotate the tailgate assembly 32 from the open position to the closed position. The drum 46 is powered by the actuator 48 to rotate in the first rotational direction 56. The drum 46 rotates in the second rotational direction 58 to unwind or un-spool the first cable 50 from the drum 46, while the tailgate assembly 32 rotates from the closed position to the open position. The drum 46 is free to rotate about the drive axis 52 in the second rotational direction 58, without a motive input from the actuator 48. Accordingly, the actuator 48 is only powered to provide the motive output to cause the drum 46 to rotate in the first rotational direction 56, and does not power or cause the drum 46 to rotate in the second rotational direction 58.

The first cable 50 is attached to the drum 46 and spooled about or onto the drum 46 in response to rotation of the drum 46 in the first rotational direction 56. It should be appreciated that the first cable 50 is spooled into the first helical groove 54 on the drum 46 as the drum 46 rotates in the first rotational direction 56. As shown in FIG. 2, the first cable 50 extends from within the interior space 42 of the tailgate structure 38, through a first opening 60 in the tailgate structure 38, to a first rotatable cable connection 62, shown in FIG. 5, disposed outside the interior space 42 of the tailgate structure 38. The first opening 60 is disposed along the tailgate axis 34 at a longitudinal first end 64 of the tailgate structure 38.

Figure 5:
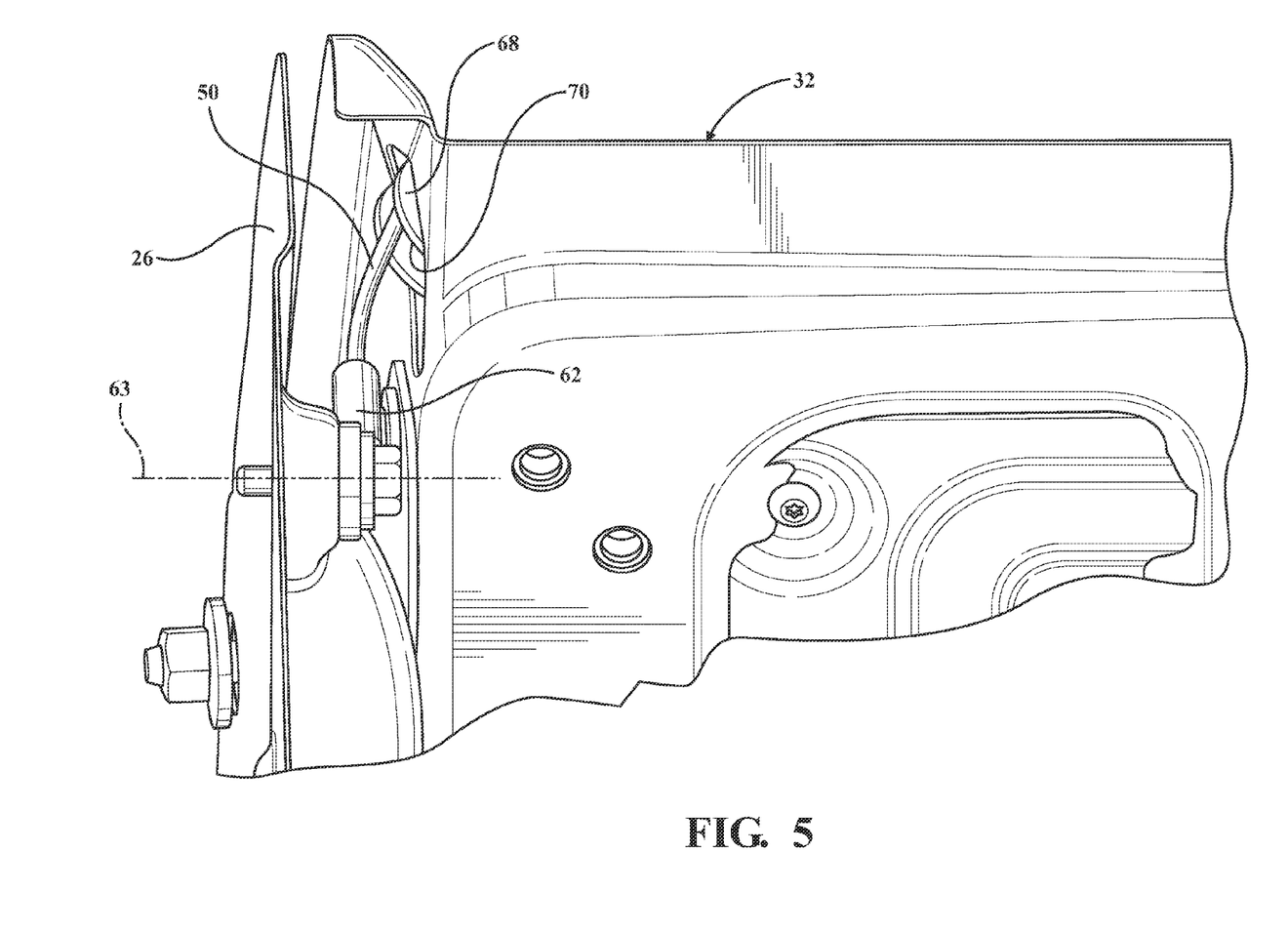
FIG. 5 is a partial, schematic perspective view of the cargo box showing a first cable of the lifting mechanism attached to the cargo box.

Referring to FIG. 5, the first rotatable cable connection 62 connects the first cable 50 to a structural component of a vehicle. As shown, the first rotatable cable connection 62 connects the first cable 50 to the first side wall 26 of the box structure 22. Accordingly, it should be appreciated that the first cable 50 includes an interior end that is attached to the drum 46, and an exterior end that is attached to the box structure 22 via the first rotatable cable connection 62. The first rotatable cable connection 62 allows rotation of the first cable 50 about an attachment axis 63 relative to the box structure 22. The attachment axis 63 is generally parallel with the tailgate axis 34. The first rotatable cable connection 62 may include, for example, a swivel eyelet formed into the exterior end of the first cable 50, and fastened to the box structure 22 with a bolt or other similar fastener.

Figure 4:
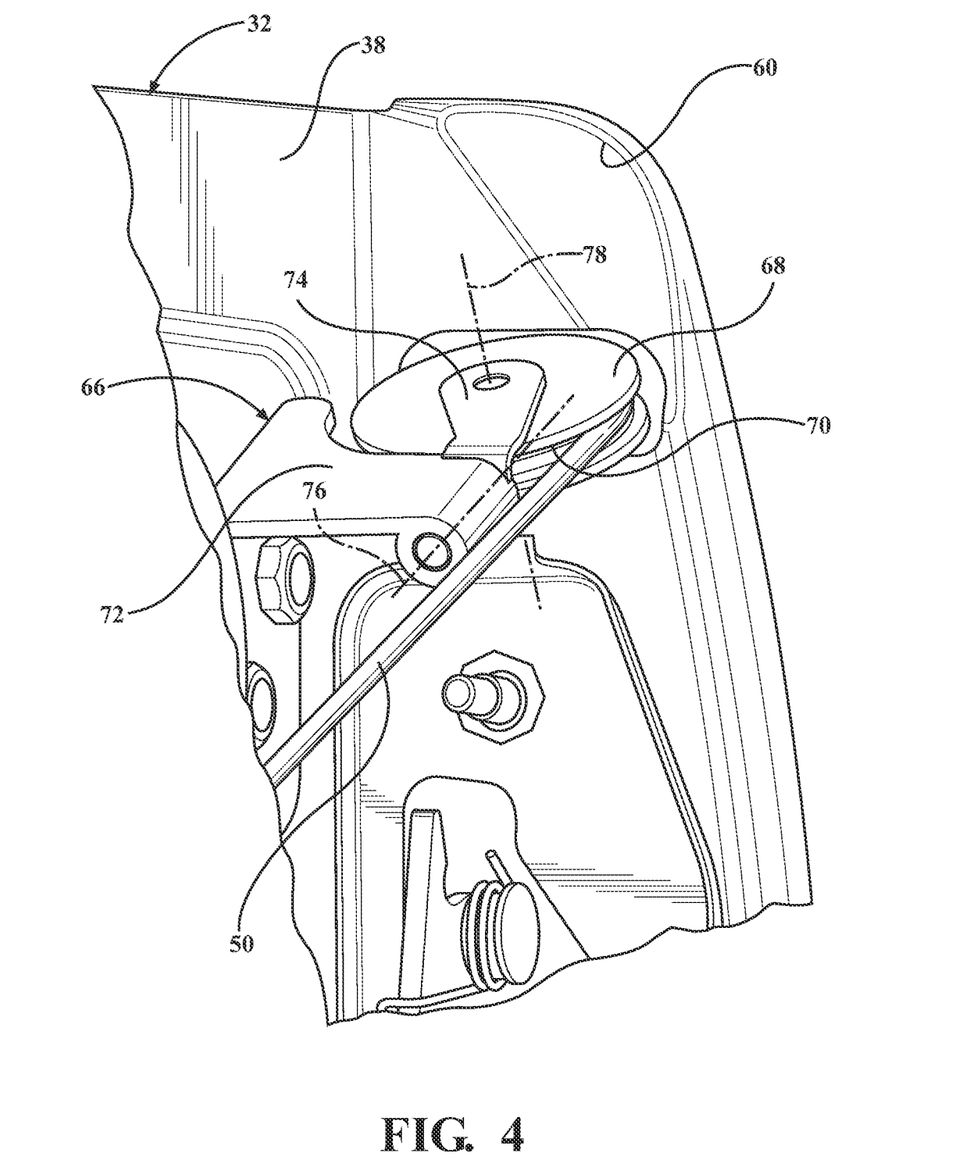
FIG. 4 is a partial, schematic perspective view of the tailgate assembly showing a first guide assembly.

Referring to FIGS. 2 and 4, the tailgate assembly 32 includes a first guide assembly 66 that is preferably disposed within the interior space 42 of the tailgate structure 38. The first guide assembly 66 includes a first roller guide 68 that defines a first roller groove 70. The first cable 50 is engaged with or seated in the first roller groove 70, and is guided by the first roller groove 70. The first guide assembly 66 redirects the orientation or position of the first cable 50 between a first section, shown in FIG. 2, and a second section, shown in FIG. 6. The first section of the first cable 50 may be defined as the portion of the first cable 50 disposed between the drum 46 and the first guide assembly 66, and the second portion of the first cable 50 may be defined as the portion of the first cable 50 disposed between the first guide assembly 66 and the first rotatable cable connection 62. The first portion of the first cable 50 is disposed in an orientation that is generally parallel with the reference plane 40. The second portion of the first cable 50 is disposed in an orientation that is generally transverse to the reference plane 40. Accordingly, the first guide assembly 66 redirects the first cable 50 between an orientation that is generally parallel with the reference plane 40, and an orientation that is generally transverse to the reference plane 40.

Referring to FIG. 4, the first guide assembly 66 includes a bracket 72 that is fixedly attached to the tailgate structure 38. The bracket 72 rotatably supports a connecting member 74 for rotation about a first guide axis 76. The connecting member 74 rotatably supports the first roller guide 68 for rotation about a pulley axis 78. The pulley axis 78 is generally perpendicular to and is offset from the first guide axis 76. The first guide axis 76 is generally perpendicular to the tailgate axis 34. Accordingly, the first roller guide 68 rotates relative to the tailgate structure 38 about the pulley axis 78, and may rotate or swing relative to the tailgate structure 38 about the first guide axis 76.

Figure 6:
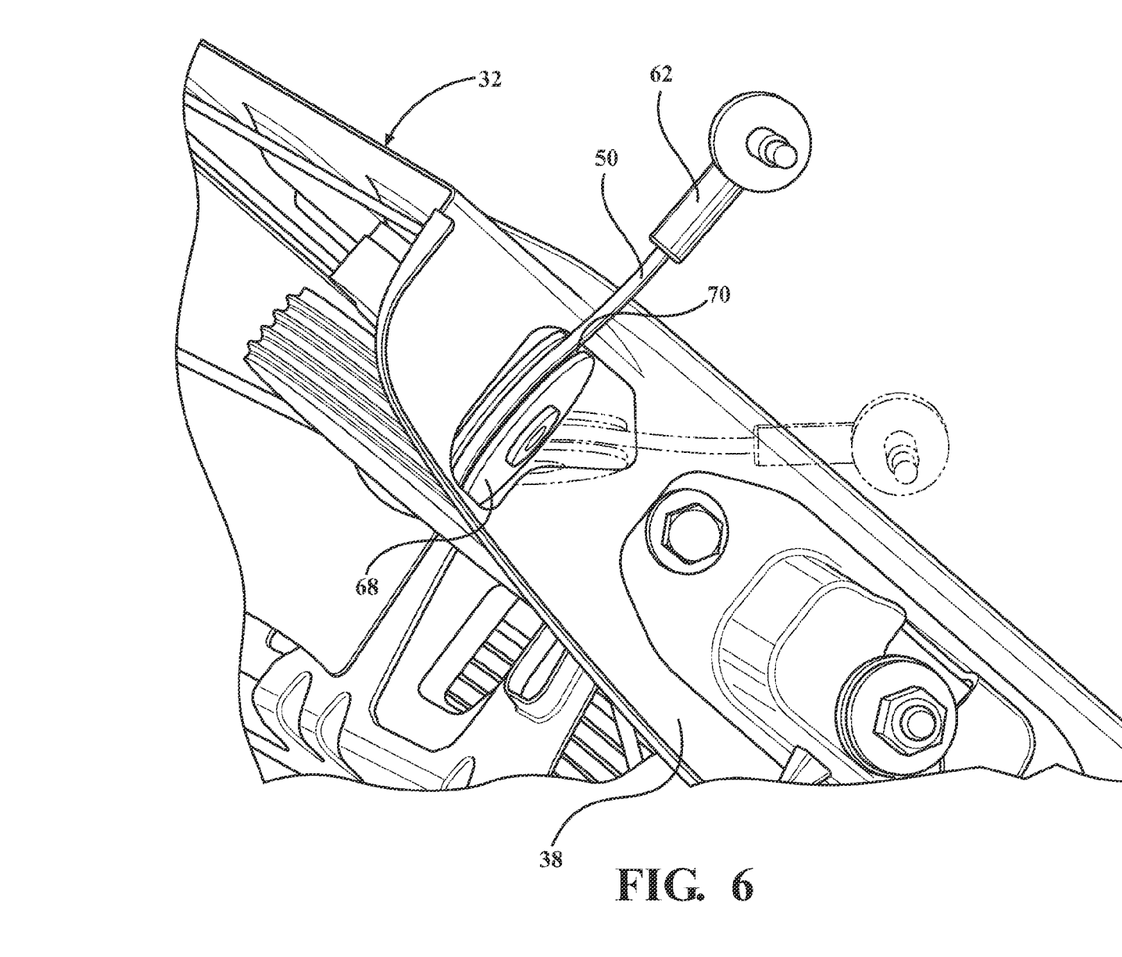
FIG. 6 is a partial, schematic perspective view of the tailgate assembly showing a position of the first guide assembly and the first cable when the tailgate assembly is disposed in a closed position (solid lines) and an open position (phantom lines).

The first roller guide 68 rotates about the pulley axis 78 to reduce friction between the first roller guide 68 and the first cable 50 as the first cable 50 is spooled onto or spooled off from the drum 46. The first roller guide 68 rotates or swings about the first guide axis 76 to keep the first cable 50 securely seated within the first roller groove 70 of the first roller guide 68, as the tailgate assembly 32 rotates about the tailgate axis 34 between the open position and the closed position. As the tailgate assembly 32 rotates between the closed position and the open position, the angle between the first opening 60 and the first rotatable cable connection 62 changes. FIG. 6 shows the position of the first roller guide 68 and the first cable 50 in the closed position in solid lines, and shows the position of the first roller guide 68 and the first cable 50 in the open position on phantom lines. If the first roller guide 68 were not able to rotate or swing about the first guide axis 76, the change in the orientation or direction of the first cable 50 may cause the first cable 50 to be pulled out of the first roller groove 70. Accordingly, the first guide assembly 66 is configured to allow the first roller guide 68 to swing or pivot about the first guide axis 76, to automatically align the first roller groove 70 with the direction of the first cable 50, thereby helping to ensure that the first cable 50 stays seated within the first roller groove 70. Additionally, it should be appreciated that the first rotatable cable connection 62 allows the first cable 50 to rotate about the attachment axis to accommodate the change in position or direction of the first cable 50, relative to the box structure 22, as the tailgate assembly 32 rotates between the closed position and the open position.

As shown on the page in FIG. 2, the lifting mechanism is configured to lift from both the first end 64 of the tailgate assembly 32 and a second end 96 of the tailgate assembly 32. As such, the tailgate assembly 32 includes a second cable 80 interconnecting the drum 46 and the second side wall 28 of the box structure 22. As shown in FIG. 3, the drum 46 includes a second helical groove 82, with the second cable 80 engaged with and seated within the second helical groove 82. As shown in FIG. 2, the tailgate assembly 32 includes a second guide assembly 84 having a second roller guide 86 defining a second roller groove 88. The second cable 80 is engaged with and guided by the second roller groove 88 in the same manner that the first cable 50 is engaged with and guided by the first roller groove 70. The first cable 50 spools from a lower or first edge 90 of the drum 46, and the second cable 80 spools from an upper or second edge 92 of the drum 46. The second edge 92 of the drum 46 is disposed opposite the first edge 90 of the drum 46 and across the drive axis 52 from the first edge 90 of the drum 46. The first cable 50 and the second cable 80 spool from opposing edges of the drum 46 so that rotation of the drum 46 in the first rotational direction 56 spools up both the first cable 50 and the second cable 80, and rotation of the drum 46 in the second rotational direction 58 un-spools both the first cable 50 and the second cable 80.

It should be appreciated that the second cable 80, and the second guide assembly 84 operate in the same manner as the first cable 50 and the first guide assembly 66 to lift or raise the tailgate assembly 32 from both sides of the tailgate assembly 32. However, it should be appreciated that the tailgate assembly 32 may be configured within only the first cable 50 and the first guide assembly 66. If configured with only one cable, then the drum 46 and the actuator 48 may be located near the first opening 60, such as shown in phantom in FIG. 2.

To lower or open the tailgate assembly 32, a user must manually release a latch mechanism 94 that secures the tailgate assembly 32 to the box structure 22, and manually lower the tailgate assembly 32 downward into the open position. Because the drum 46 may freely rotate in the second rotational direction 58, the first cable 50 un-spools from the drum 46 as the tailgate assembly 32 rotates downward. The lifting mechanism is not configured to lower the tailgate assembly 32 because the user must manually release the latch mechanism 94, and is thereby in a position to lower the tailgate assembly 32. In order to raise the tailgate assembly 32, the user must only signal the actuator 48 to rotate the drum 46, such as by depressing a control switch or other similar control structure, thereby causing the actuator 48 to rotate the drum 46 in the first rotational direction 56. As the drum 46 rotates, the drum 46 spools up the first cable 50, thereby shortening the length of the first cable 50 between the drum 46 and the first rotatable cable connection 62 connecting the first cable 50 to the box structure 22, and causing the tailgate assembly 32 to rotate about the tailgate axis 34 into the raised or closed position.

It should be appreciated that if the cargo box 20 is equipped with a remote latch that automatically releases the latch mechanism 94 to release the tailgate assembly 32 from the box structure 22, then the lifting mechanism could be configured to lower the tailgate assembly 32 from the closed position to the open position, as well as lift the tailgate assembly 32 from the open position to the closed position. In so doing, the actuator 48 would provide the motive force to rotate the drum 46 in both the first rotational direction 56 and the second rotational direction 58, and the drum 46 would not be able to freely rotate relative to the actuator 48 in the second rotational direction 58.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A cargo box comprising:
   a box structure having a first side wall;
   a tailgate assembly rotatably attached to the box structure and moveable between an open position and a closed position about a tailgate axis, the tailgate assembly including:
   a drum rotatable about a drive axis;
   a first cable attached to both the drum and the first side wall;
   an actuator coupled to the drum and operable to rotate the drum about the drive axis in a first rotational direction to wind the first cable around the drum to rotate the tailgate assembly about the tailgate axis, from the open position to the closed position;
   a first guide assembly having a first roller guide defining a first roller groove, with the first cable engaged with and guided by the first roller groove;
   wherein the first roller guide is rotatable relative to the tailgate assembly about a first guide axis;
   wherein the first guide assembly includes a bracket rotatably supporting a connecting member for rotation about the first guide axis; and
   wherein the connecting member rotatably supports the first roller guide for rotation about a pulley axis.

2. The cargo box set forth in claim 1 wherein the pulley axis is generally perpendicular to and is offset from the guide axis.

3. The cargo box set forth in claim 2 wherein the guide axis is generally perpendicular to the tailgate axis.

4. The cargo box set forth in claim 1 wherein the drum includes a surface defining a first helical groove, with the first cable engaged with and guided by the first helical groove.

5. The cargo box set forth in claim 1 wherein the tailgate assembly includes a tailgate structure defining an interior space, with the drum and the actuator disposed within the interior space of the tailgate structure.

6. The cargo box set forth in claim 5 wherein the tailgate structure defines a first opening disposed along the tailgate axis at a longitudinal first end of the tailgate structure, with the first cable extending through the first opening.

7. The cargo box set forth in claim 1 wherein the first cable includes a rotatable cable connection interconnecting the first cable and the box structure, wherein the rotatable cable connection allows rotation of the first cable about an attachment axis relative to the box structure.

8. The cargo box set forth in claim 1 wherein the drum is rotatable about the drive axis in a second rotational direction, opposite the first rotational direction, to unwind the first cable from the drum as the tailgate assembly rotates about the tailgate axis from the closed position to the open position.

9. The cargo box set forth in claim 8 wherein the drum is free to rotate about the drive axis in the second rotational direction, without a motive input from the actuator.

10. The cargo box set forth in claim 1 wherein:
    the box structure includes a second side wall laterally spaced from the first side wall;
    the tailgate assembly includes a second cable interconnecting the drum and the second side wall; and
    wherein the tailgate assembly includes a second guide assembly having a second roller guide defining a second roller groove, with the second cable engaged with and guided by the second roller groove, and wherein the second guide assembly redirects the second cable between an orientation generally parallel with a reference plane, and an orientation generally transverse to the reference plane.

11. The cargo box set forth in claim 10 wherein the drum includes a second helical groove.

12. The cargo box set forth in claim 11 wherein the first cable spools from a first edge of the drum, and the second cable spools from a second edge of the drum, wherein the second edge of the drum is disposed opposite the first edge of the drum and across the drive axis from the first edge of the drum.

13. A tailgate assembly comprising:
    a tailgate structure disposed generally parallel with a reference plane, and extending along a tailgate axis, wherein the tailgate structure defines an interior space and is configured for rotation about the tailgate axis between an open position and a closed position;
    a drum supported by the tailgate structure within the interior space of the tailgate structure, and rotatable relative to the tailgate structure about a drive axis;
    an actuator supported by the tailgate structure and coupled to the drum, wherein the actuator is operable to rotate the drum about the drive axis in a first rotational direction;
    a first cable attached to the drum and spoolable about the drum in response to rotation of the drum in the first rotational direction, wherein the first cable extends through an opening in the tailgate structure to a rotatable cable connection configured for connecting the first cable to a structural component of a vehicle; and
    a first guide assembly disposed within the interior space of the tailgate structure, and having a first roller guide defining a first roller groove, with the first cable engaged with and guided by the first roller groove;
    wherein the first guide assembly redirects the first cable between an orientation generally parallel with the reference plane, and an orientation generally transverse to the reference plane;
    wherein the first roller guide is rotatable relative to the tailgate assembly about a first guide axis, which is generally perpendicular to the tailgate axis, to maintain the first cable within the first roller groove of the first guide assembly as the tailgate assembly rotates about the tailgate axis between the open position and the closed position; and
    wherein the first guide assembly includes a bracket attached to the tailgate structure and rotatably supporting a connecting member for rotation about the first guide axis, wherein the connecting member rotatably supports the first roller guide for rotation about a pulley axis.

14. The tailgate assembly set forth in claim 13 wherein the pulley axis is generally perpendicular to and is offset from the guide axis.

15. The tailgate assembly set forth in claim 13 wherein the drum includes a surface defining a first helical groove, with the first cable engaged with and guided by the first helical groove.

* * * * *